Figure 1:
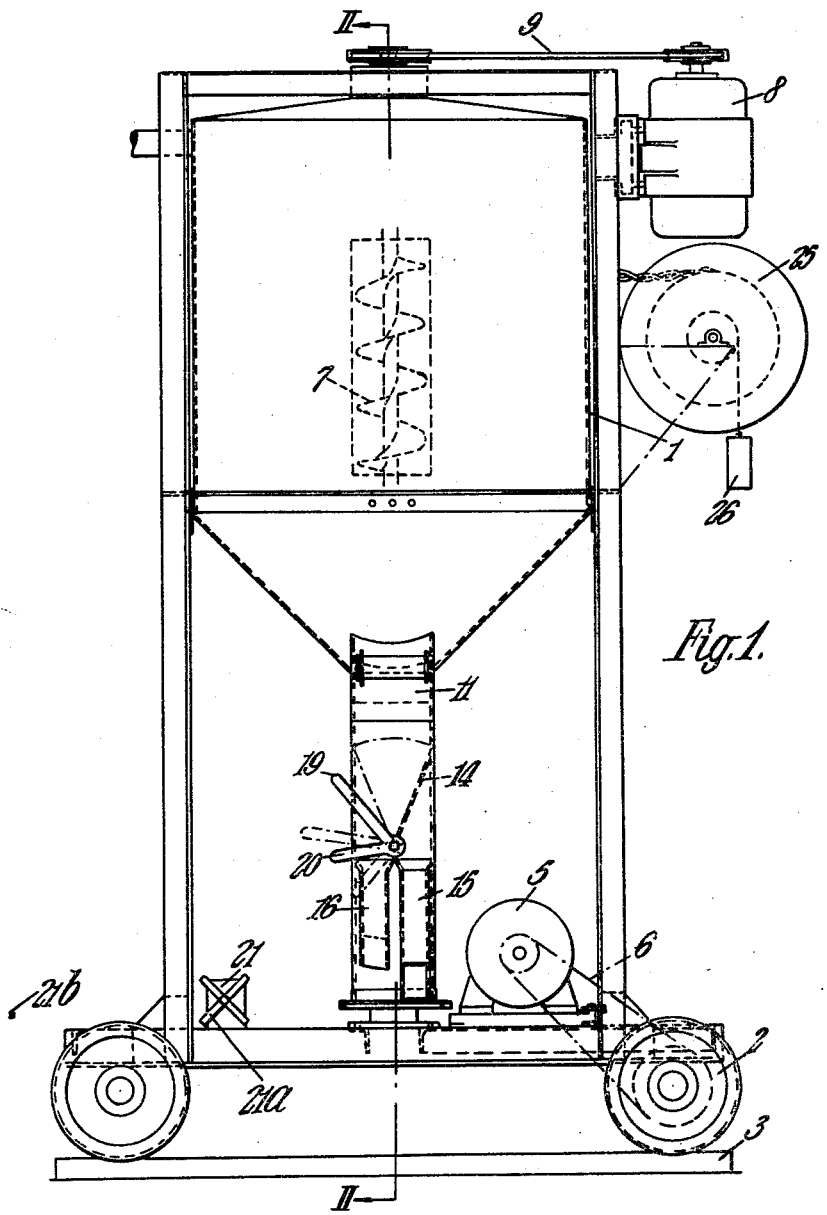

United States Patent Office 3,186,689
Patented June 1, 1965

3,186,689
APPARATUS FOR MIXING AND DISPENSING
FEED AND LIKE MATERIALS
Reginald Blair Davies, Blue Hill Farm,
Watton-at-Stone, England
Filed Dec. 3, 1963, Ser. No. 327,660
13 Claims. (Cl. 259—44)

This application is a continuation-in-part of my application Serial No. 177,937, filed March 2, 1962, and now abandoned.

This invention relates to apparatus for continuously dispensing feed and like materials, as into a trough for pigs.

It is an object of the invention to provide an apparatus which can be used to mix and to dispense the required amounts of feed material to a group of troughs.

The invention consists of apparatus for mixing and dispensing feed or like material, comprising a mixer and dispenser mounted on transport wheels for transportation past a receptacle for the feed or like material, the said mixer and dispenser including at least one outlet leading to the first delivery way to conduct the feed or like material to the receptacle and to a second delivery way to recycle the feed or like material into the hopper by means of a conveyor, entry to said first and second delivery ways being controlled by a flap member adapted to direct the material into one or other of the delivery ways or to divide the flow between the delivery ways, the flap member being arranged to be adjusted from outside the mixer and dispenser by abutment means mounted adjacent the receptacle.

Preferably the flap member is adjustable by contacts between an adjustment lever connected thereto and an adjustable abutment located on or near the receptacle.

Conveniently, a closing abutment is arranged to contact the said lever as the apparatus passes the end of the receptacle.

Further feed outlets may be provided at a different level, e.g. for filling bulk feeders, as opposed to troughs.

To accommodate these extra outlets, the material may be arranged to pass out of the conveyor at a single level and means may be provided to allow the material to pass to the bulk outlet or to be diverted to the first and second delivery ways controlled by the externally adjustable flap.

The material from the second or recycle delivery way may be diverted to an open low level receptacle or hopper communicating with the inlet to the conveyor, and in order to provide for low level filling of the apparatus, a closable opening may be provided to allow material to pass from the conveyor outlet to the dispenser interior, which also communicates with the inlet to the conveyor.

The invention further consists in a feed installation comprising at least one trough or like receptacle, guide means past the receptacle and an apparatus as set forth above, adapted to run so as to be guided by the guide means and to be controlled by abutments located on or near the said receptacles.

The guide means may be in the form of a steering guide, i.e. a rail or groove, for steering the apparatus.

Accordingly, the transport wheels may be mounted in independently swingable frames mounted on the vehicle for rotation about substantially vertical axes, steering guide engagement means being mounted on each of the frames and movable between operative position to engage the steering guide and retracted position out of engagement with the steering guide.

Each frame may have fore and aft steering guide engagement means selectively adapted to engage the steering guide depending on the direction of movement of the vehicle.

Preferably the engagement means are mounted on sub frames pivoted to the first and second frames and arranged to reciprocate between positions in which the fore and aft engagement means engage the steering guide.

Such a piece of apparatus provides for a virtually complete automation of animal feeding. The dispenser can be arranged to pass a set of troughs to be filled, filling them as it goes and then to reverse past the same set to the starting point for refilling, e.g. for a run past a second set of troughs.

The invention will be further described with reference to the accompanying drawings, which show, by way of example only, three embodiments of installations in accordance with the present invention.

Figure 2:
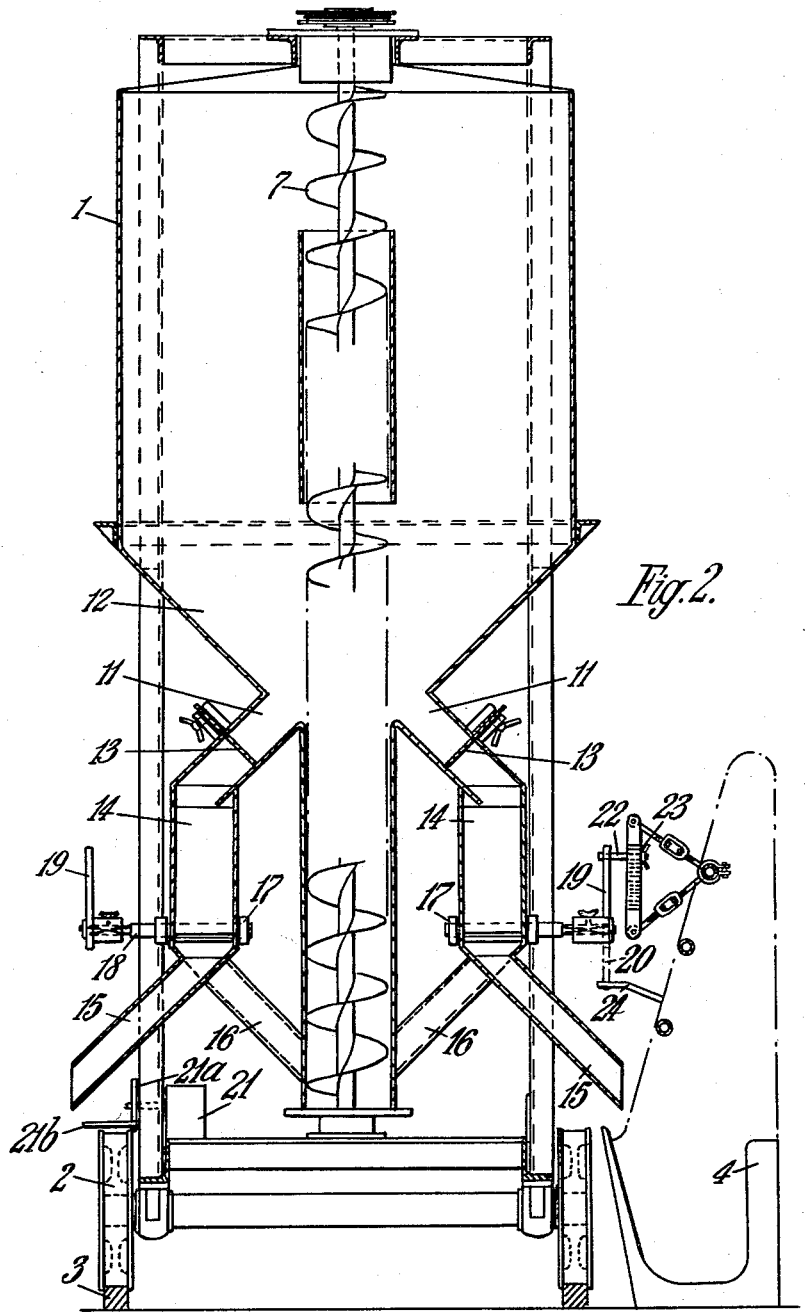
Figure 3:
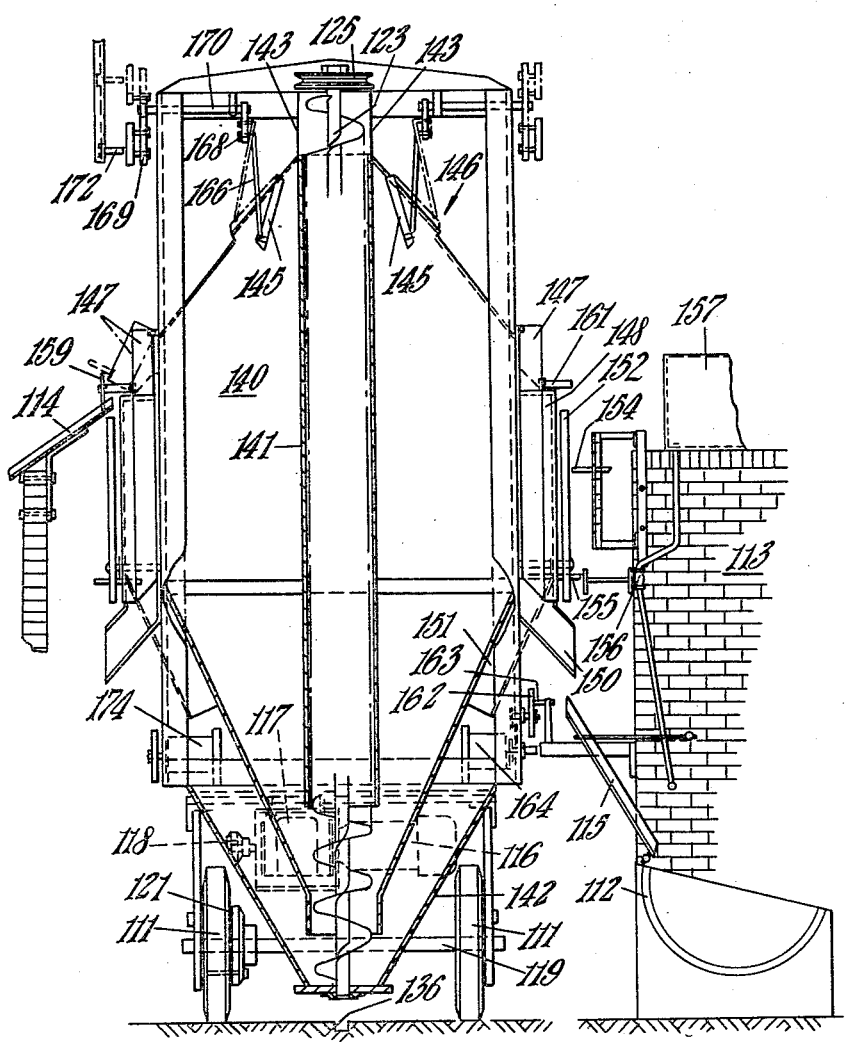
Figure 4:
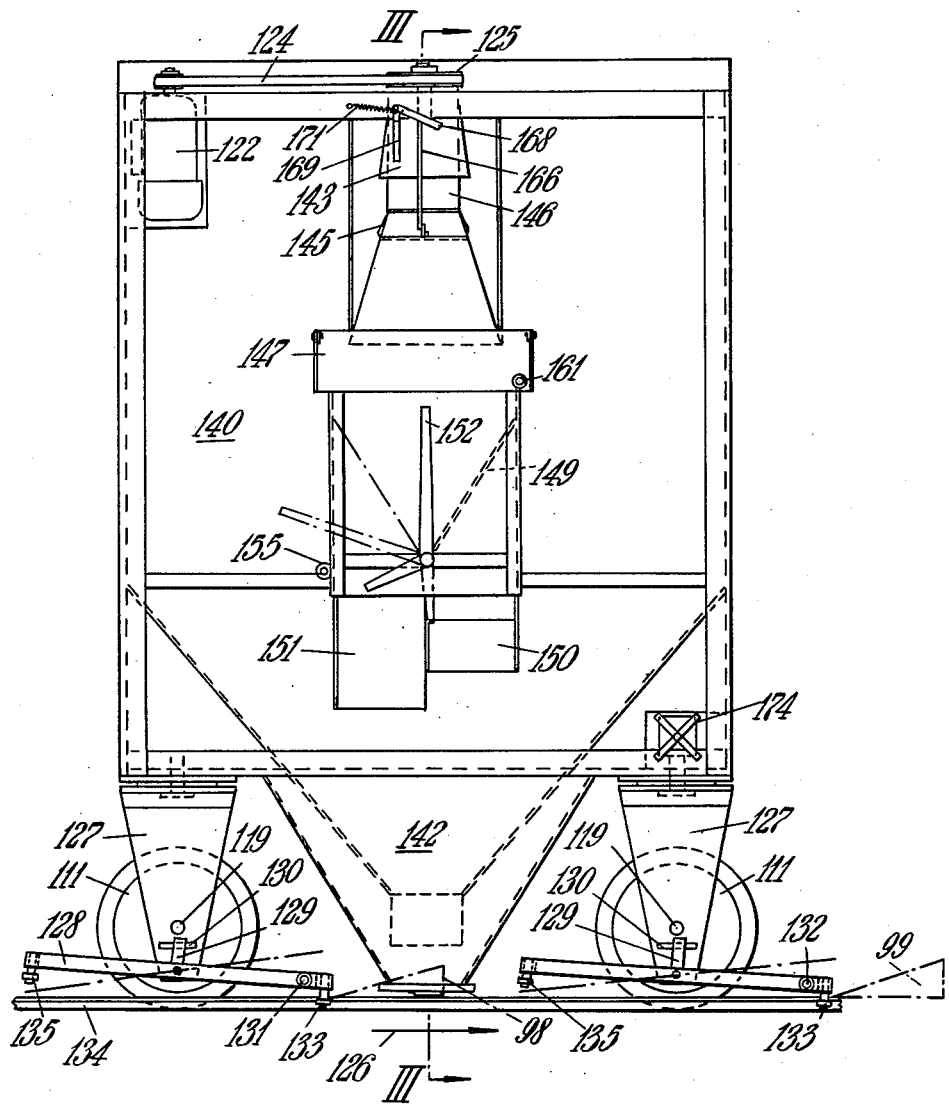

In the drawings:
FIGURE 1 is a side elevation of an apparatus according to the invention;
FIGURE 2 is a section on the line II—II of FIGURE 1, showing one trough and the control apparatus associated therewith;
FIGURE 3 is a semi diagrammatic sectional elevation on the line IV—IV of FIGURE 4 of a preferred form of apparatus according to the invention, with certain parts omitted for clarity, also indicating the position of a receptacle to be filled; and
FIGURE 4 is a side elevation of the apparatus of FIGURE 3, shown in conjunction with a modified form of steering guide.

FIGURES 1 and 2 show a dispenser 1, which may also act as a mixer, mounted on a frame for transportation by means of wheels 2 running on rails 3 passing between lines of troughs 4, of which only one is shown. The wheels are driven by an electric motor 5 over a chain or belt drive 6.

The dispenser itself may be of any convenient size or type, the one illustrated being a 5 cwt. capacity model comprising a screw conveyor 7 driven by a motor 8 over a belt 9. A pair of outlets 11 from the hopper 12 of the dispenser are controlled by adjustable guillotine type doors 13. A flap valve 14 is adapted, as best seen in FIGURE 1, to direct the feed material passing through the guillotine type door 13 into either a delivery chute 15 leading to a trough 4 or into a return conduit 16, or to divide the flow between the two. The position indicated is for complete recycling, i.e. no output, while the full output position is shown dotted. Return conduits 16 lead to the foot of conveyor 7 whence feed recycled is returned to the interior of the dispenser. Each flap valve 14 is mounted on a shaft 18 supported in friction type bearings 17, and having non-rotatably secured to the outer end thereof a bell crank lever having arms 19 and 20.

Abutments or pegs 22 are adjustably mounted on fixed frame members located at or adjacent the commencement of the run of the apparatus through each pen, and are adapted to contact the arms 19 and move them downwardly towards the position shown dotted in FIGURE 1 to open the flap valve to allow a flow of meal into the trough, the actual flow being dependent on the height of the peg 22, the total flow for the trough being preferably indicated on a calibrated scale 23.

Closure abutments or pegs 24 are adapted to contact arms 20 and close the flap valves at the end of the troughs.

At the end of the complete run, means may be provided automatically to reverse motor 5 and shut off motor 8. Such means may comprise a ganged switch 21 operated by a star shaped rotor 21a striking a peg 21b at the end of the run.

To avoid fouling with the pegs 22 and 24 by the control arms 19 and 20, the pegs are hinged to yield easily on the return run.

To avoid tangling and fouling of the leads for the motor they may be wound onto a drum 25 and kept taut by a weight 26 or by a flap spiral spring loading the drum 25.

With a speed of 6 inches per second a normal ten foot trough would receive 30 lb. of meal at a flow of 1½ lb. per second and this has been found to be satisfactory full flow rate.

For a 5 cwt. dispenser this performance may be achieved using 1½ H.P. motors.

The drive and conveyor motors may both be D.C. motors and hence may be moved from building to building without the necessity of providing cables for power supply.

As shown in FIGURES 3 and 4 of the drawings, the apparatus comprises a dispenser, which may also to some extent mix the feed (ground cereal), mounted on transport wheels 111 so is to be transported past a series of troughs 112 for normal feeding of pigs in a series of pens. One pen wall is shown at 113. FIGURE 3 also shows a chute 114 at a higher level than the chute 115 leading to trough 112 leading to a bulk or dry feeder for ad lib feeding. The apparatus is designed to dispense the required amounts of feed into each trough 112 and bulk feeder along a set path and to return to its starting point unattended. Such a machine is regarded as valuable in saving labour when large numbers of animals, such as pigs, have to feed regularly.

The apparatus is electrically powered and has a reversible transport motor 116 driving one of the transport wheels over reduction gearing 117 and a chain drive sprocket 118. The transport wheels 111 are freely mounted on axles 119 and the drive wheel has a sprocket 121 secured thereto. A second motor 122 drives a vertically extending auger 123 or screw conveyor over a belt 124 and pulley 125. The motors may each be D.C. motors driven from a battery (not shown) carried on the apparatus, or they may be A.C. motors driven from the mains by means of a cable arranged to be unreeled and reeled up (by means not shown) as the apparatus travels away from and towards the main outlet.

FIGURE 4 shows in some detail the steering mechanism (omitted from FIGURE 3 for reasons of clarity). The vehicle is shown set to run in the direction indicated by the arrow 126. The transport wheels 111 are mounted in frames 127 independently swingable about generally vertical axes. Pivoted on the frame 127 about horizontal axes are sub frames 128. Vertical extensions 129 of the sub frames 128 engage friction holds 130 to retain the sub frames 128 in any set position. Horizontally mounted rollers 131 and 132 laterally offset from one another, are arranged to ride up ramps 98, 99, at the end of an outward run of the vehicle to reciprocate the sub frames 128 from the position shown to a position (shown dotted) in which the fore rollers 133 are removed from contact with steering guide rail 134 and the aft rollers 135 are in engagement with the rail 134.

The fore and aft rollers are mounted for rotation on axes vertical when the rollers are engaged with the rail 134. Each roller 133, 135 shown in the figure is in fact duplicated by a second roller behind the rail so that there is positive steering by the rail.

The steering system illustrated may be used with a steering guide groove as shown at 136 in FIGURE 4, with the rollers 133 and 135 running in the groove.

The dispenser itself comprises a hopper-bottomed bin 140 through the centre of which runs the vertical auger 123 largely enclosed in a tube 141. The bin may be of any suitable capacity, e.g. 5 or 10 hundredweight. The auger 123 passes out through the bottom of the bin 140 into an outer low level filling and recycling hopper 142. The auger is thus arranged to carry meal from the hopper 142 into the interior of the bin 140 and up the inside of the tube 141. In the absence of meal in the hopper the auger will carry meal from the bottom of the bin up the tube 141.

Just above the top of the bin 140 the tube 141 has a pair of outlet apertures 143, one facing each side of the dispenser. The dispenser is symmetrical in regard to the flow arrangements from these apertures so that only one side of the dispenser need be described. From each aperture the meal flows down an inclined chute 146 formed in a depressed section of the outside of the bin 140. The meal flows over a filling door 145, which in closed position forms part of the chute 146 and the chute 146 then becomes divergent. At the lower end of the chute 146 there is a direction plate which is movable between an open position in which it allows free flow of meal into chutes such as 114 for supply to bulk feeders and a closed position in which it diverts the meal into a regulator 148, where a flap 149 is arranged to divide the flow between a first delivery way 150, feeding onto the chutes such as 115, and a second or recycle delivery way 151 feeding into the hopper 142.

It will be understood that the flow may be completely through either of the delivery ways 150, 151 or may be divided between them.

The controls for the doors 145, plates 147 and flap 149 are all externally and automatically adjustable as the dispenser passes the receptacles to be fed. The flap 149 is controlled by a two-armed lever 152 shown in FIGURE 4 in full lines in a position allowing complete recycling and in dotted lines in a position allowing complete flow through the delivery way 150. The lever 152 is arranged to strike an adjustable abutment 154 as the delivery way 150 comes opposite a chute 115. This causes meal to flow through the delivery way 150 and thus flow continuous until the lower arm of the lever 152 strikes a further abutment at the end of the trough. The adjustment of the abutment 154 is in a vertical direction to control the degree of opening of the delivery way 150 by the flap 149.

An abutment 155 on the dispenser is arranged to open a tap 156 in a water supply line from a tank 157 so that water may be mixed with the meal as required. Fixedly arranged adjacent each of the chutes 114 is a steel abutment 159 in the form of a crescent or half circle which co-operates with a peg 161 on each of the plates 147 to lift the plates into the open position so that the meal may flow onto the chute 114. At the same time a switch mechanism 162 is operated by a fixed abutment 163 to shut off the motor 116 and hold the dispenser stationary. After a prescribed delay, set by a time switch 164, the motor is automatically restarted and the dispenser continues on its way so that the plates 147 return to their closed positions.

Each of the doors 145 is attached by a link 166 to a toggle mechanism formed by levers 168 and 169 on a shaft 170 and urged by a spring 171 so as to hold the doors 145 in fully open or fully closed positions. The lever 169 is operated by fixed abutments 172 to push the toggle mechanism over centre in either direction as required.

It will be understood that all the abutments operating control elements on the dispenser are hinged to allow the apparatus to pass through freely on the return run. Reversing switch 174 is operated at the end of the outward run to reverse the motor 116 and commence the return run.

The arrangement shown in FIGURES 3 and 4 operates as set out below.

With the bin 140 emptied the doors 145 are open and the motor 122 is started to drive the auger 123. Meal emptied into the hopper 142 is carried by the auger up to the tube 141 through the apertures 143 and then passes through the doors 145 into the interior of the bin. By this means the bin is eventually filled to its full capacity. At this stage the outward run may commence and initially the meal is still recycled by the auger from the bottom of the bin and into the tube via the doors 145. On reaching the first group of troughs and/or bulk feeders to be supplied the doors are closed by abutments 172 and the meal runs down to the direction plates 147 to be directed to chutes 114 and 115 as required or recycled through the second delivery way 151 into the hopper 142.

After traversing each group of troughs and/or bulk feeders the door 145 may be reopened so that mixing may continue.

At the conclusion of the outward run the rollers 131 and 132 run up their respective ramps 98 and 99 to reverse the roller sub frames 128 to prepare the steering for the return run. At this stage the reversing switch 174 is operated by a suitable abutment and the return run commences.

Since the abutments are all hinged they have no effect on the various controls on the return run which proceeds continuously at the conclusion of the return run the switch 174 is cycled to a further position which shuts off the motor 116. This position may also be arranged to shut off the motor 122.

Various modifications may be made within the scope of the invention.

I claim:

1. An apparatus for mixing and dispensing feed and like materials comprising hopper means for the feed and like material, receptacle means positioned along a predetermined path with respect to said hopper means, means operably associated with said hopper means for moving said hopper means relative to said receptacle means, recirculating conveyor means connected to said hopper means, first and second delivery means operably connected with said hopper means, and positioned to discharge to said receptacle means and conveyor means, respectively, valve means operatively located between said hopper means and said first and second delivery means operable selectively for diverting the feed from the hopper means via said first delivery means for deposit into the receptacle means and/or to the second delivery means for movement to said conveyor means, and means located exteriorly of said delivery means and operably coupled with said valve means for adjusting such valve means.

2. Apparatus as claimed in claim 1, in which the adjusting means comprises an adjustment lever connected to the valve means, and an abutment located in the region of the receptacle means in a position in which, as the hopper means travels towards the receptacle means, the abutment contacts the adjustment lever to open the valve means to admit feed material to the first delivery means.

3. Apparatus as claimed in claim 2, further comprising a closing abutment member located in the region of the receptacle so that as the hopper means travels away from the receptacle the closing abutment contacts the adjustment lever to move the valve means to prevent admission of the feed material to the first delivery way.

4. Apparatus as claimed in claim 1, in which the recirculating conveyor means is a screw conveyor extending upwardly from the bottom of the mixer.

5. Apparatus as claimed in claim 1, in which the mixer comprises additional upper delivery means for dispensing at a different level from the said first delivery means, and flow control means for selecting which delivery means is to be fed.

6. Apparatus as claimed in claim 5, comprising a flow path for the material passing out of the hopper means at a single upper level, and to the upper delivery means, and said flow control means comprising means adapted to be selectively placed in said flow path to divert the flow to the first and second delivery means.

7. Apparatus as claimed in claim 6, comprising an open low level receptacle on the hopper means communicating with a conveyor means inlet, said flow control means comprising a closable opening in said flow path communicating with a conveyor means outlet and allowing the material to pass from the outlet to the interior of the hopper means, said second delivery means leading to the said low level receptacle.

8. A feed installation comprising a trough or like receptacle for feed material; guide means adjacent said receptacle; a mixer comprising a hopper; means for driving the mixer past the receptacle guided by said guide means; a recirculating conveyor leading into said hopper, an outlet from said hopper, first and second delivery ways and a flap controlling entry to said delivery ways so as to direct material flowing from the outlet selectively into the first delivery ways for delivery to the receptacle, into the second delivery way for delivery to the recirculating conveyor, or to divide the flow between the delivery ways; and means for adjusting the flap from outside the mixer.

9. An installation as claimed in claim 8, in which the guide means are rails.

10. An installation as claimed in claim 8, in which the guide means is a steering guide for steering the apparatus.

11. Apparatus as claimed in claim 1, including a steering guide, first and second independently swingable frames mounted on the hopper means for rotation about substantially vertical axes, transport wheels mounted on said frames, steering guide engagement means mounted on each of the frames and movable between operative position to engage the steering guide and retracted position out of engagement with the steering guide.

12. An apparatus as claimed in claim 11, comprising fore and aft steering guide engagement means mounted on said frames and arranged selectively to engage the steering guide depending on the direction of movement of the vehicle.

13. Apparatus as claimed in claim 12, comprising sub frames pivoted to the first and second frames about substantially horizontal axes, the steering guide engagement means being mounted on the sub frames for rocking movement with the sub frames between positions in which the fore and aft engagement means engage the steering guide.

References Cited by the Examiner

UNITED STATES PATENTS

| 643,102 | 2/00 | Bates | 222—318 X |
| 2,517,456 | 8/50 | Wherrett | 259—97 X |
| 2,825,511 | 3/58 | Byberg | 259—97 X |
| 2,885,191 | 5/59 | Hansen | 259—97 X |

FOREIGN PATENTS

| 793,244 | 4/58 | Great Britain. |

CHARLES A. WILLMUTH, *Primary Examiner.*